US008527326B2

(12) United States Patent
Bagheri et al.

(10) Patent No.: US 8,527,326 B2
(45) Date of Patent: Sep. 3, 2013

(54) DETERMINING MATURITY OF AN INFORMATION TECHNOLOGY MAINTENANCE PROJECT DURING A TRANSITION PHASE (75) Inventors: Saeed Bagheri, Croton on Hudson, NY (US); Krishna Ratakonda, Yorktown Heights, NY (US); Rose Williams, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 12/956,421

(22) Filed: Nov. 30, 2010

(65) Prior Publication Data
US 2012/0136695 A1 May 31, 2012

(51) Int. Cl.
*G06Q 10/00* (2012.01)

(52) U.S. Cl.
USPC .......................... 705/7.38; 705/7.39; 705/7.41

(58) Field of Classification Search
USPC ........................................ 705/7.38, 7.39, 7.41
See application file for complete search history.

(56) References Cited

U.S. PATENT DOCUMENTS

| 6,216,108 | B1 | 4/2001 | LeVander |
| 6,684,193 | B1 | 1/2004 | Chavez et al. |
| 7,558,719 | B1 | 7/2009 | Donlin |
| 7,698,188 | B2 | 4/2010 | Hollas et al. |
| 8,019,640 | B2* | 9/2011 | Barel et al. .................... 705/7.32 |
| 2002/0143606 | A1* | 10/2002 | Atefi et al. ....................... 705/10 |
| 2003/0055804 | A1* | 3/2003 | LaButte et al. ................. 706/50 |
| 2003/0093310 | A1 | 5/2003 | Macrae |
| 2003/0110124 | A1 | 6/2003 | Escher |
| 2004/0068431 | A1* | 4/2004 | Smith et al. ...................... 705/10 |
| 2004/0117470 | A1* | 6/2004 | Rehm ............................ 709/223 |
| 2005/0198486 | A1* | 9/2005 | Desmond et al. ................. 713/1 |
| 2007/0006044 | A1* | 1/2007 | Dan et al. ......................... 714/38 |
| 2008/0021768 | A1 | 1/2008 | Ross |
| 2008/0126163 | A1* | 5/2008 | Hogan et al. ...................... 705/8 |
| 2008/0249975 | A1* | 10/2008 | Grabarnik et al. .............. 706/52 |
| 2009/0111382 | A1* | 4/2009 | Yao ............................. 455/67.7 |
| 2010/0057519 | A1* | 3/2010 | Dorai et al. ....................... 705/9 |
| 2010/0161471 | A1 | 6/2010 | Fendick |

OTHER PUBLICATIONS

Ritchie, George, "Service Desk/Helpdesk Metrics and Reporting: Getting Started," Serio Ltd, 2008.*
Kesner, Richard M.,"IT Service Delivery: Models and Frameworks," Enterprise Operations Management, Auerbach Publications, 2003.*
"Help-Desk Operations a Key Target for Efficiency Gains," Service Desk Management, Computer Economics Report, vol. 31, No. 6, Jun. 2009.*
Basavaraj, M.J. and Shet, K.C.,"Estimating and Prediction of Turn around Time for Incidents in Application Service Maintenance Projects" Journal of Software, vol. 3, No. 7, Oct. 2008.*

* cited by examiner

*Primary Examiner* — Andre Boyce
*Assistant Examiner* — Renae Feacher
(74) *Attorney, Agent, or Firm* — Ryan, Mason & Lewis, LLP (57) ABSTRACT Techniques for determining maturity of a delivery process in an information technology maintenance project are provided. The techniques include collecting information during a delivery process, wherein the information comprises operational data, aggregating the collected information for each delivery dimension into one or more aggregate delivery measures, wherein the one or more aggregate delivery measures comprise one or more delivery dimensions, comparing the one or more delivery dimensions against a threshold to determine a level of maturity for each delivery dimension, and determining an overall level of maturity of the delivery process by combining the level of maturity for each delivery dimension.

22 Claims, 3 Drawing Sheets

DETERMINING MATURITY OF AN INFORMATION TECHNOLOGY MAINTENANCE PROJECT DURING A TRANSITION PHASE

CROSS-REFERENCE TO RELATED APPLICATIONS

The present application is related to U.S. patent application entitled "Delivery Management Effort Allocation," identified by Ser. No. 12/956,412 and filed concurrently herewith, the disclosure of which is incorporated by reference herein in its entirety.

FIELD OF THE INVENTION

Embodiments of the invention generally relate to information technology (IT), and, more particularly, to delivery management.

BACKGROUND OF THE INVENTION

A project undergoes delivery management reviews (at different levels) in its life cycle. The breadth, level and frequency of reviews can depend on the project's financial performance. For example, a project with solid performance and above-expectation return may have few reviews in its life cycle, but a project with consistent negative gross profit may experience continuous scrutiny from various management levels.

A challenge in delivery management is allocating the management effort to various projects and ensuring that the proper delivery management balance is maintained across a portfolio. In many scenarios, by way of example, typically no more than 20% of the projects in a portfolio can undergo delivery management review in a quarter. Therefore, proper selection of projects to review in a quarter is important.

One aspect is selecting projects to undergo delivery review is a project's financial outlook. Accordingly, the ability to predict the financial status of projects in a portfolio can significantly facilitate the process of effort allocation in delivery management. For example, knowing the estimated net (or inception-to-date) gross profit for each project in a portfolio in the next three months (that is, next quarter) can possibly guide a delivery management effort allocation problem.

SUMMARY OF THE INVENTION

Principles and embodiments of the invention provide techniques for determining maturity of an IT maintenance project during a transition phase. An exemplary method (which may be computer-implemented) for determining maturity of a delivery process in an information technology maintenance project, according to one aspect of the invention, can include steps of collecting information during a delivery process, wherein the information comprises operational data, aggregating the collected information for each delivery dimension into one or more aggregate delivery measures, wherein the one or more aggregate delivery measures comprise one or more delivery dimensions, comparing the one or more delivery dimensions against a threshold to determine a level of maturity for each delivery dimension, and determining an overall level of maturity of the delivery process by combining the level of maturity for each delivery dimension.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include determining maturity of an IT maintenance project during a transition phase. As detailed herein, one or more embodiments of the invention include generating appropriate alerts to facilitate the detection of a problem with project health during a transition phase.

Many long-term IT maintenance agreements can land in trouble during the transition phase. By way of example, reasons for the trouble could possibly include resource skill mismatch, inadequate staffing, inadequate knowledge transfer, unreasonable and/or inflexible service level agreement (SLA) requirements, etc. Accordingly, one or more embodiments of the invention include a system for determining the maturity of an IT project in the transition phase by examining operational data collected, for example, in typical ticket management systems and matching it against historical operational data. Consequently, an emphasis can be put on real-time tracking of operational data and assessing the level of maturity of an IT maintenance project. In a project that is performing well, the risk indicators reach a level below the acceptable steady state level well before the end of the transition period.

Additionally, one or more embodiments of the invention include combining operational data into a set of aggregate delivery maturity metrics that span a number of IT maintenance services, and operationalizing the calculation of the delivery maturity metric in the context of service delivery. As detailed herein, one or more embodiments of the invention can include a focus on aspects of measuring IT maintenance service delivery such as conformance, improvement, knowledge aggregation and isolation.

Conformance provides an objective measurement for the magnitude of deviation from the mandated process, which in turn determines the validity of the measurement system itself. Improvement measures improvement (or decline) in key performance indicators (KPIs) that measure performance on both delivery and operational fronts. Knowledge aggregation measures the process of systematizing and capturing the knowledge of the delivery process so that time taken to solve common issues is reduced and proactive measures can be put in place. Isolation measures, statistically, whether certain activities, groups, individuals, skill sets, etc. have isolated problems for each KPI. For good performance, isolated problems should be minimal.

In one or more embodiments of the invention, each of these aspects of delivery is associated with delivery risk metrics, which are then tracked during the transition phase. Acceptable minimum performance thresholds are established for each risk attribute using, for example, a statistical approach or based on contractual terms established with a client. If the performance, as measured by the delivery risk metrics, is consistently above the minimum threshold across all of the key aspects of delivery over a set period of time, that can be taken as an indicator that the project has reached a satisfactory level of maturity. During the transition phase, the extent by which the delivery risk metrics are above the thresholds is an indicator of the amount of work needed to be done to be able to move into steady state delivery.

As noted above, one or more embodiments of the invention include a focus on the aspect of conformance in measuring IT maintenance service delivery. Typically, each process or activity that is tracked in a measurement system is time-stamped. The assumption is that the activity is performed after the "open" time-stamp and the "closed" time-stamp happens when the activity is completed. The metrics against the activity should be reported within a reasonable time period after the completion of the activity. Deviations from this scenario can cast doubt on the validity of the measurement system itself Significant deviations can, for example, indicate that the measurement system itself becomes suspect.

Figure 1:
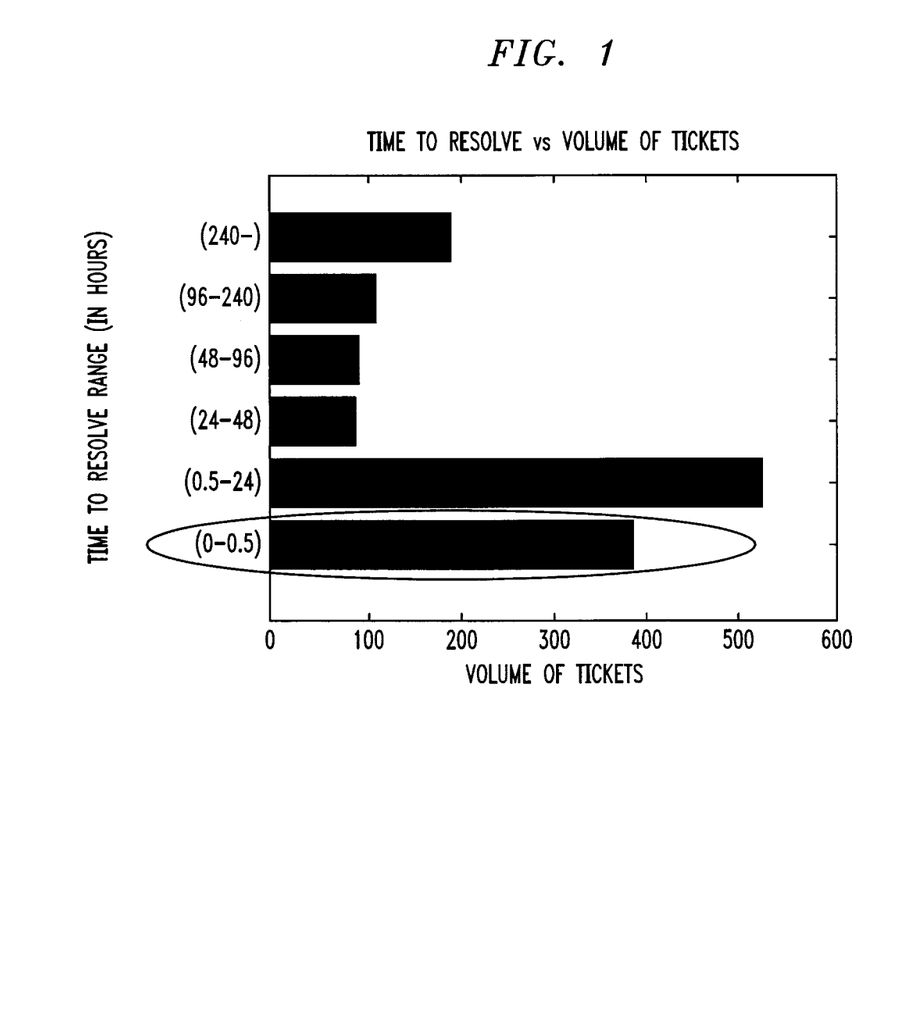
FIG. 1 is a diagram illustrating an example of poor conformance in the context of measuring IT maintenance service delivery.

By way of example, FIG. 1 is a diagram illustrating an example of poor conformance in the context of measuring IT maintenance service delivery. As depicted in FIG. 1, data from an account in transition showed 30% of tickets being closed within 30 minutes, while average time taken to resolve a ticket being around 1 day. A possible cause for this could be, for example, that the data entry timestamps do not match the actual period during which the ticket was handled. In such a case, SLA numbers (and other KPIs) under-report the magnitude of trouble.

By way of example and not limitation, one or more embodiments of the invention can include quantifying conformance via the following measures. Let $O_i^A$ be the open time stamp, $C_i^A$ be the closing time stamp for the $i^{th}$ instance of an activity of type A, and $m^A$, $\sigma^A$ be the mean and standard deviation of the time taken to do an activity of type A. The percentage of instances of activities of type A for which $(C_i^A - O_i^A)$ is greater than $m^A + 2\sigma^A$ (or $m^A + 3\sigma^A$) is an indicator of the deviation from ideal performance. In this case, $m^A$ and $\sigma^A$ are set from trusted data or established from industry trends.

In another measure, if $M_i^A$ is defined as the time stamp when the last measurement related to the $i^{th}$ instance of activity A is entered into the system, and a grace period of $G^A$ is allowed, then the percentage of instances when activities of type A for which $(M_i^A - C_i^A)$ is greater than $G^A$ is another measure of deviation from ideal performance. Additionally, in one or more embodiments of the invention, individual conformance metrics can be aggregated into an overall conformance metric using various techniques such as, for example, weighted average, maximum value across indicators (after normalization), etc.

As noted, one or more embodiments of the invention also include a focus on the aspect of improvement in measuring IT maintenance service delivery. Accordingly, one or more embodiments of the invention include using several KPIs for measuring delivery performance including, but not limited to, the following examples. Mean effort variation measures deviation of actual effort from a benchmark. Effort variance includes a standard deviation of the effort from the benchmark. Mean schedule delay measures deviation in planned versus actual delivery dates. Defects per activity measures the average number of defects per unit of completed work. Defect injection rate measures the number of defects found during testing phase. Percent time spent on rework measures the percent of total time spent on a rework.

Additional KPIs include percent time spent on knowledge capture, as well as load distribution variance, which measures variance of idle time across a group of people engaged in similar activities. Also, transition delay measures the aggregate productive time spent waiting for hand-offs. Average resource utilization measures the percent time spent on productive (billable) work. Percent respond SLAs met measures respond SLAs that are based on time between opening a ticket and first response. Further, percent resolve SLAs met measures resolve SLAs that are based on time between opening a ticket and resolution.

Additionally, in one or more embodiments of the invention, individual improvement metrics can be aggregated into an overall delivery performance metric. Metrics such as, for example, schedule delay and SLA measurement can be preserved as separate measures as determined by enterprise need.

As also detailed herein, one or more embodiments of the invention also include a focus on the aspect of knowledge aggregation in measuring IT maintenance service delivery. As a maintenance team becomes familiar with IT applications and systems, it can be expected that the amount of work involved in resolving tickets gets reduced. The reduction is typically not uniform in all activities; some activities, such as providing information to end users, may benefit more from knowledge aggregation. In one or more embodiments of the invention, both direct and indirect measures of knowledge aggregation can be used to track progress in this dimension. Direct measures can include percent of tickets using knowledge assets harvested from the same account, wherein knowledge assets can range from scripts developed to deal with common problems to shared code that was used to address similar problems in the past.

Direct measures also include percent of time spent on using knowledge assets ("research time") during ticket resolution, as well as percent growth in number of certified knowledge assets over a period of time (for example, a week or month). Further, another direct measure can include percent of tickets using knowledge assets shared across accounts. Some accounts do standard work, which enables sharing and using knowledge gathered when servicing tickets on other accounts.

Indirect measures of knowledge aggregation can include, by way of example, percent reduction in time to service a ticket of a given category aggregated over all categories in comparison to a benchmark set at the beginning of the transition period. Additionally, indirect measures can also include percent improvement in SLA performance for a given category of tickets aggregated over all categories.

Further, as noted above, one or more embodiments of the invention also include a focus on the aspect of isolation in measuring IT maintenance service delivery. As a maintenance team matures (for example, progresses from a first phase to a second phase of an application), performance issues should become lesser but also become more evenly spread across several dimensions such as, for example, activities, groups, individuals and skill sets. Persistent hot spots indicate delivery problems that can be fixed either by effective resource management, rebalancing the skill set, or through other actions.

In one or more embodiments of the invention, several measures can be defined by each dimension (such as, for example, type of activity) to measure whether there is statistically significant set of outliers (that is, hot spots). An example measure can include the set of activities which are in the top 5% of problem accounts in two or more improvement KPIs. Further, in one or more embodiments of the invention, an aggregate measure of isolation can be formed through weighted average or through other means of combining individual measures.

Figure 2:
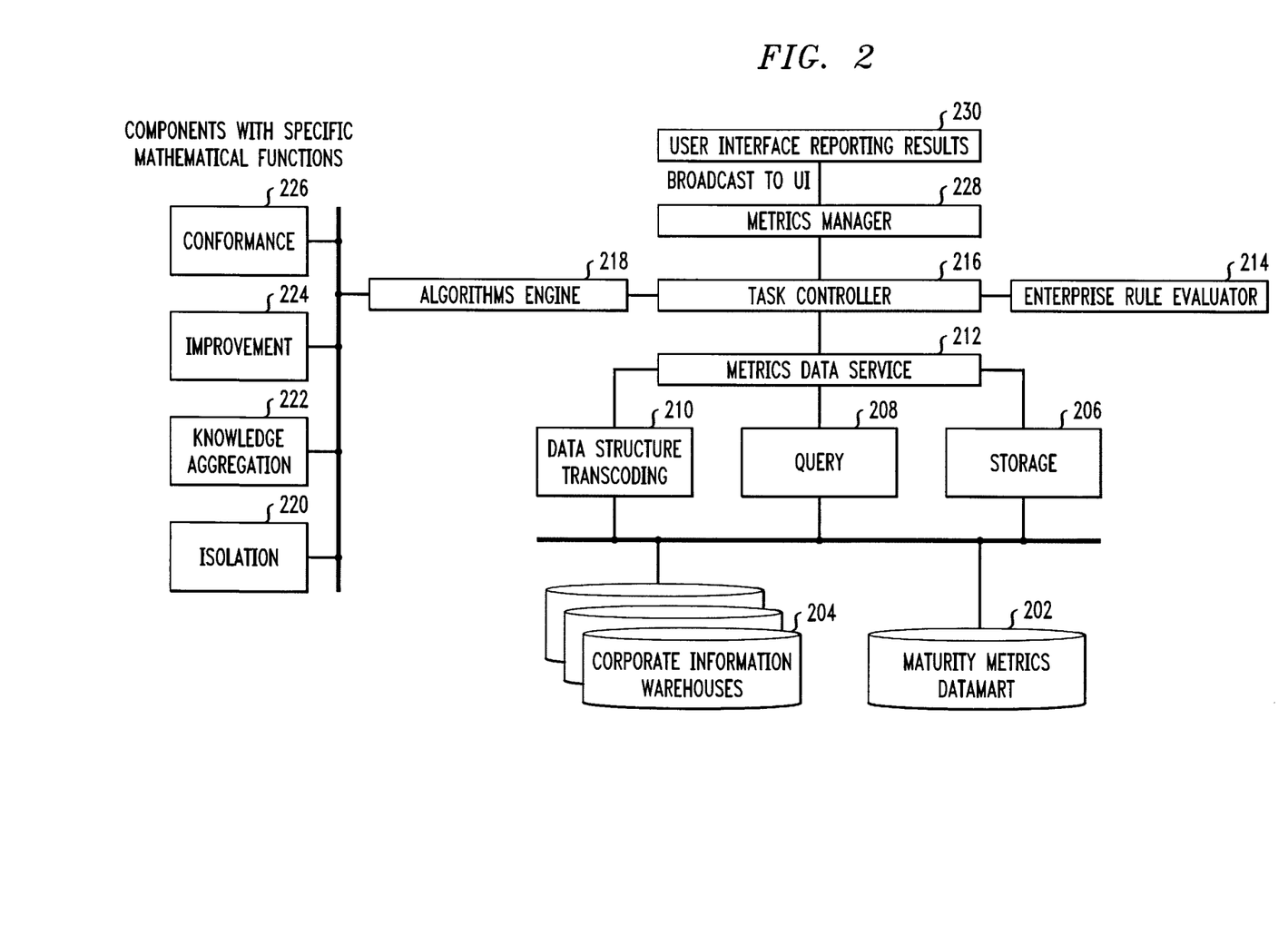
FIG. 2 is a block diagram illustrating an example embodiment, according to an aspect of the invention.

FIG. 2 is a block diagram illustrating an example embodiment, according to an aspect of the invention. By way of illustration, FIG. 2 depicts a maturity metrics datamart module 202, a corporate information warehouses module 204, a storage module 206, a query module 208, a data structure transcoding module 210, a metrics data service module 212, an enterprise rule evaluator module 214, a task controller module 216, an algorithms engine module 218, a metrics manager module 228 and a user interface module 230. FIG. 2 also depicts an isolation component 220, a knowledge aggregation component 222, an improvement component 224 and a conformance component 226.

The maturity metrics datamart module 202 is a repository that is specific to the system and stores system events and equation results. This module also uses these contents for metadata trend analyses. The corporate information warehouses module 204 include a variety of enterprise-wide information warehouses used to store global project related data.

The metrics data service module 212 is responsible for interfacing with data storage and retrieval functions. Utility functions encompassed within the metrics data service module 212 can include, for example, storage module 206, query module 208 and data structure transcoding module 210. Storage module 206 interfaces directly with the maturity metrics datamart module 202 to store system results and metadata. Query module 208 interfaces with the corporate information warehouses module 204 to extract data. Data structure transcoding module 210 takes the extracted warehouse information and coverts it into data consumable by the enterprise rule evaluator module 214 and the algorithms engine module 218.

Additionally, the enterprise rule evaluator module 214 includes the definition of specific enterprise procedures with accompanying qualifiers and acceptance guidelines. The task controller module 216 is responsible for interfacing with the data services and data evaluators (enterprise rule module and algorithms engine module). Taking the converted object from the metrics data service module 212, the task controller module 216 invokes the enterprise rule evaluator module 214. Following rule processing, the task controller module 216 then invokes the function of the algorithms engine module 218, unless the rules evaluator 214 requires additional data from the data service module to continue or reprocess rules accordingly. The task controller module 216 takes the result from the algorithms engine module and passes the equation results (maturity metric) to the metrics manager module 228.

This metric is assessed for phase closure based on meeting maturity level guidelines coupled with enterprise rule definitions. If all requirements are met, the current phase is concluded and the task controller module 216 invokes the next process in the delivery metrics analysis pipeline (whereby all functions are repeated).

The algorithms engine module 218 is responsible for managing the different mathematical components. Following a sequence of equation executions, the algorithms engine module 218 passes the final calculation (the maturity metric) to the task controller module 216 for further action. Each equation is encapsulated in its own component with unique inputs, formulas, and resulting outputs. By way of example, the algorithms engine module can manage mathematical components such as a conformance component 226, an improvement component 224, a knowledge aggregation component 222, and an isolation component 220.

FIG. 2 also depicts the metrics manager component 228, which interfaces with the task controller module 216, requesting storage of the maturity metric and other data. The metrics manager component 228 also broadcasts results to the user interface 230 for reporting.

Figure 3:
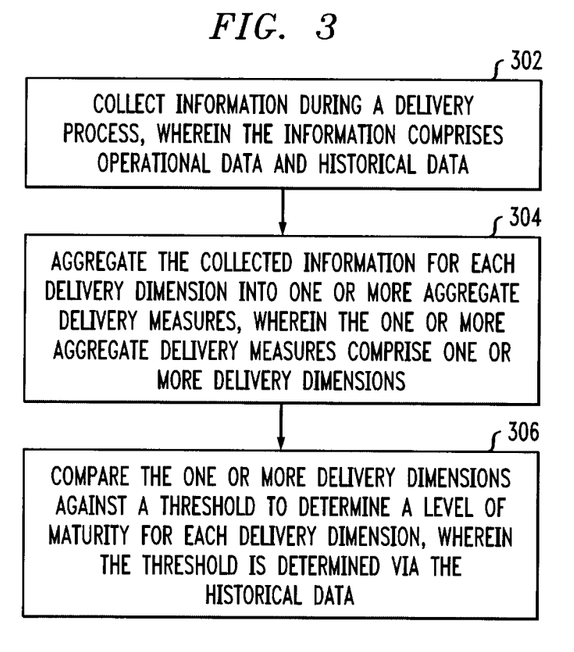
FIG. 3 is a flow diagram illustrating techniques for determining maturity of a delivery process in an information technology maintenance project, according to an embodiment of the invention.

FIG. 3 is a flow diagram illustrating techniques for determining maturity of a delivery process in an information technology maintenance project, according to an embodiment of the present invention. Step 302 includes collecting information during a delivery process, wherein the information comprises operational data and historical data. This step can be carried out, for example, using a maturity metrics datamart module and a corporate information warehouses module. Different resources can have different aspects, and accordingly operational data can include, for example, time spent on project, details/implications of ticket resolutions, etc.

Step 304 includes aggregating the collected information for each delivery dimension into one or more aggregate delivery measures, wherein the one or more aggregate delivery measures comprise one or more delivery dimensions. This step can be carried out, for example, using an algorithm engine module.

Step 306 includes comparing the one or more delivery dimensions against a threshold (for example, using one or more statistical techniques) to determine a level of maturity for each delivery dimension, wherein the threshold is determined via the historical data. This step can be carried out, for example, using a metrics manager module. Statistical techniques can include, for example, an average or mean, standard deviation in connection with a threshold, etc.

The techniques depicted in FIG. 3 can also include determining an overall level of maturity of the delivery process by combining the level of maturity for each delivery dimension. Further, the delivery dimensions can be associated with one or more delivery risk metrics tracked during a transition phase of the delivery process. Also, the delivery dimensions can include, for example, conformance, improvement, knowledge aggregation, and isolation.

As detailed herein, conformance provides an objective measurement for a magnitude of deviation from the process. Quantifying conformance can include determining a percentage of instances of activities of type A for which $(C_i^A - O_i^A)$ is greater than $m^A + 2\sigma^A$ to determine deviation from ideal performance, wherein $O_i^A$ is an open time stamp, C a closing time stamp for an $i^{th}$ instance of an activity of type A, and $m^A$, $\sigma^A$ are a mean and standard deviation of time taken to do an activity of type A. Quantifying conformance can also include determining a percentage of instances when activities of type A for which $(M_i^A - C_i^A)$ is greater than $G^A$ to determine a measure of deviation from ideal performance, wherein $M_i^A$ is a time stamp when a last measurement related to an $i^{th}$ instance of activity A is entered, $C_i^A$ is a closing time stamp for an instance of an activity of type A, and $G^A$ is an allowed grace period. Further, individual conformance metrics can be aggregated into an overall conformance metric (using various techniques such as, for example, weighted average, maximum value across indicators (after normalization), etc.).

Additionally, as noted herein, improvement measures improvement in key performance indicators that measure performance on a delivery front and/or an operational front. Key performance indicators can include, for example, mean effort variation, effort variance, mean schedule delay, defects per activity, defect injection rate, percent time spent on rework, percent time spent on knowledge capture, load distribution variance, transition delay, average resource utilization, percent respond service level agreements met, and percent resolve service level agreements met. Further, individual improvement metrics can be aggregated into an overall delivery performance metric.

As also described herein knowledge aggregation measures a process of systematizing and capturing knowledge of the delivery process (for example, so that time taken to solve a common issue is reduced and proactive measures can be put in place). Direct and indirect measures of knowledge aggregation can be used to track progress in the knowledge aggregation delivery dimension. Direct measures can include, for example, percentage of tickets using knowledge assets harvested from a same account, percentage of time spent on using knowledge assets during ticket resolution, percentage growth in number of certified knowledge assets over a period of time, and percentage of tickets using knowledge assets shared across multiple accounts. Further, indirect measures of knowledge aggregation can include, for example, percentage reduction in time to service a ticket of a given category aggregated over all categories in comparison to a benchmark set at a beginning of a transition period, and percentage improvement in service level agreement performance for a given category of tickets aggregated over all categories.

Additionally, isolation measures whether components (for example, activities, groups, individuals, skill sets, etc.) have an isolated problem for each key performance indicators. An aggregate measure of isolation can be formed by combining individual measures (for example, through weighted average).

The techniques depicted in FIG. 3 can also include establishing one or more thresholds for each delivery dimension using statistical measures on historical data collected from one or more projects (for example, from the same project or from other projects) and/or using one or more contractual terms established with a client. Additionally, one or more embodiments of the invention include generating an alert to facilitate detection of a problem with project health during a transition phase.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a maturity metrics datamart module, a corporate information warehouses module, an algorithm engine module and a metrics manager module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
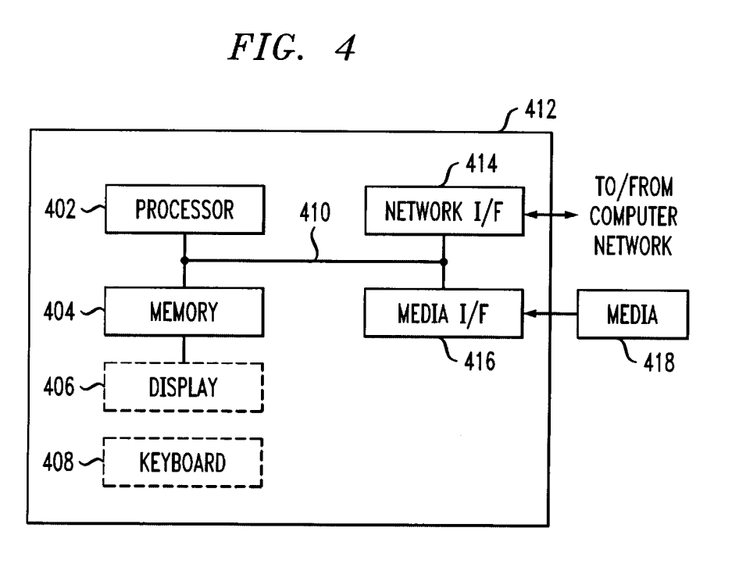
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, combining operational data into a set of aggregate delivery maturity metrics that span a number of IT maintenance services.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for determining maturity of a delivery process in an information technology maintenance project, wherein the method comprises:
    collecting information during the delivery process, wherein the information comprises operational data and historical data, said collecting carried out by a module executing on a hardware processor;
    aggregating the collected information for each of one or more delivery dimensions, said aggregating carried out by a module executing on a hardware processor, and wherein the one or more delivery dimensions comprise at least conformance, wherein conformance provides an objective measurement for a magnitude of deviation from the delivery process by determining a percentage of instances of activities of type A for which $(C_i^A - O_i^A)$ is greater than $m^A + 2\sigma^A$ to determine deviation from ideal performance, wherein $O_i^A$ is an open time stamp, $C_i^A$ is a closing time stamp for an $i^{th}$ instance of an activity of type A, and $m^A$, $\sigma^A$ are a mean and standard deviation of time taken to do an activity of type A; and
    comparing the one or more delivery dimensions, wherein the one or more delivery dimensions comprise at least conformance, against a threshold to determine a level of maturity for each of the one or more delivery dimensions, wherein the threshold is determined via the historical data, said comparing carried out by a module executing on a hardware processor.

2. The method of claim 1, further comprising determining an overall level of maturity of the delivery process by combining the level of maturity for each delivery dimension.

3. The method of claim 1, further comprising establishing one or more thresholds for each delivery dimension using one or more statistical measures on historical data collected from one or more projects.

4. The method of claim 1, further comprising establishing one or more thresholds for each delivery dimension using one or more contractual terms established with a client.

5. The method of claim 1, further comprising generating an alert to facilitate detection of a problem with project health during a transition phase.

6. The method of claim 1, wherein comparing the one or more delivery dimensions against the threshold to determine a level of maturity for each of the one or more delivery dimensions comprises using one or more statistical techniques.

7. The method of claim 1, wherein the one or more delivery dimensions are associated with one or more delivery risk metrics tracked during a transition phase of the delivery process.

8. The method of claim 1, wherein the one or more delivery dimensions further comprise at least one of improvement, knowledge aggregation, and isolation.

9. The method of claim 1, further comprising determining the percentage of instances when activities of type A for which $(M_i^A - C_i^A)$ is greater than $G^A$ to determine a measure of deviation from ideal performance, wherein $M_i^A$ is a time stamp when a last measurement related to an $i^{th}$ instance of activity A is entered, $C_i^A$ is a closing time stamp for an $i^{th}$ instance of an activity of type A, and $G^A$ is an allowed grace period.

10. The method of claim 1, wherein two or more individual conformance metrics are aggregated into an overall conformance metric.

11. The method of claim 8, wherein improvement measures improvement in one or more key performance indicators that measure performance on at least one of a delivery front and an operational front.

12. The method of claim 11, wherein the one or more key performance indicators comprise at least one of mean effort variation, effort variance, mean schedule delay, defects per activity, defect injection rate, percent time spent on rework, percent time spent on knowledge capture, load distribution variance, transition delay, average resource utilization, percent respond service level agreements met, and percent resolve service level agreements met.

13. The method of claim 11, wherein two or more individual improvement metrics are aggregated into an overall delivery performance metric.

14. The method of claim 8, wherein knowledge aggregation measures a process of systematizing and capturing knowledge of the delivery process.

15. The method of claim 14, wherein direct and indirect measures of knowledge aggregation are used to track progress in the knowledge aggregation delivery dimension.

16. The method of claim 15, wherein the direct measures of knowledge aggregation comprise at least one of percentage of tickets using knowledge assets harvested from a same account, percentage of time spent on using knowledge assets during ticket resolution, percentage growth in number of certified knowledge assets over a period of time, and percentage of tickets using knowledge assets shared across multiple accounts.

17. The method of claim 15, wherein the indirect measures of knowledge aggregation comprise at least one of percentage reduction in time to service a ticket of a given category aggregated over all categories in comparison to a benchmark set at a beginning of a transition period, and percentage improvement in service level agreement performance for a given category of tickets aggregated over all categories.

18. The method of claim 8, wherein isolation measures whether one or more components have an isolated problem for each of one or more key performance indicators.

19. The method of claim 18, wherein an aggregate measure of isolation is formed by combining two or more individual measures.

20. A computer program product comprising a tangible non-transitory computer readable recordable storage medium including computer useable program code for determining maturity of a delivery process in an information technology maintenance project, the computer program product including:

computer useable program code for collecting information during the delivery process, wherein the information comprises operational data and historical data;

computer useable program code for aggregating the collected information for each of one or more delivery dimensions, wherein the one or more delivery dimensions comprise at least conformance, wherein conformance provides an objective measurement for a magnitude of deviation from the delivery process by determining a percentage of instances of activities of type A for which $(C_i^A - O_i^A)$ is greater than $m^A + 2\sigma^A$ to determine deviation from ideal performance, wherein $O_i^A$ is an open time stamp, $C_i^A$ is a closing time stamp for an $i^{th}$ instance of an activity of type A, and $m^A$, $\sigma^A$ are a mean and standard deviation of time taken to do an activity of type A; and computer useable program code for comparing the one or more delivery dimensions, wherein the one or more delivery dimensions comprise at least conformance, against a threshold to determine a level of maturity for each of the one or more delivery dimensions, wherein the threshold is determined via the historical data.

21. A system for determining maturity of a delivery process in an information technology maintenance project, comprising:

a memory; and at least one processor coupled to the memory and operative to:

collect information during the delivery process, wherein the information comprises operational data and historical data;

aggregate the collected information for each of one or more delivery dimensions wherein the one or more delivery dimensions comprise at least conformance, wherein conformance provides an objective measurement for a magnitude of deviation from the delivery process by determining a percentage of instances of activities of type A for which $(C_i^A - O_i^A)$ is greater than $m^A + 2\sigma^A$ to determine deviation from ideal performance, wherein $O_i^A$ is an open time stamp, $C_i^A$ is a closing time stamp for an $i^{th}$ instance of an activity of type A, and $m^A$, $\sigma^A$ are a mean and standard deviation of time taken to do an activity of type A; and compare the one or more delivery dimensions, wherein the one or more delivery dimensions comprise at least conformance, against a threshold to determine a level of maturity for each of the one or more delivery dimensions, wherein the threshold is determined via the historical data.

22. An apparatus for determining maturity of a delivery process in an information technology maintenance project, the apparatus comprising:

means for collecting information during the delivery process, wherein the information comprises operational data and historical data;

means for aggregating the collected information for each of one or more delivery dimensions, wherein the one or more delivery dimensions comprise at least conformance, wherein conformance provides an objective measurement for a magnitude of deviation from the delivery process by determining a percentage of instances of activities of type A for which $(C_i^A - O_i^A)$ is greater than $m^A + 2\sigma^A$ to determine deviation from ideal performance, wherein $O_i^A$ is an open time stamp, $C_i^A$ is a closing time stamp for an $i^{th}$ instance of an activity of type A, and $m^A$, $\sigma^A$ are a mean and standard deviation of time taken to do an activity of type A; and means for comparing the one or more delivery dimensions, wherein the one or more delivery dimensions comprise at least conformance, against a threshold to determine a level of maturity for each of the one or more delivery dimensions, wherein the threshold is determined via the historical data.

* * * * *